Patented Apr. 7, 1925.

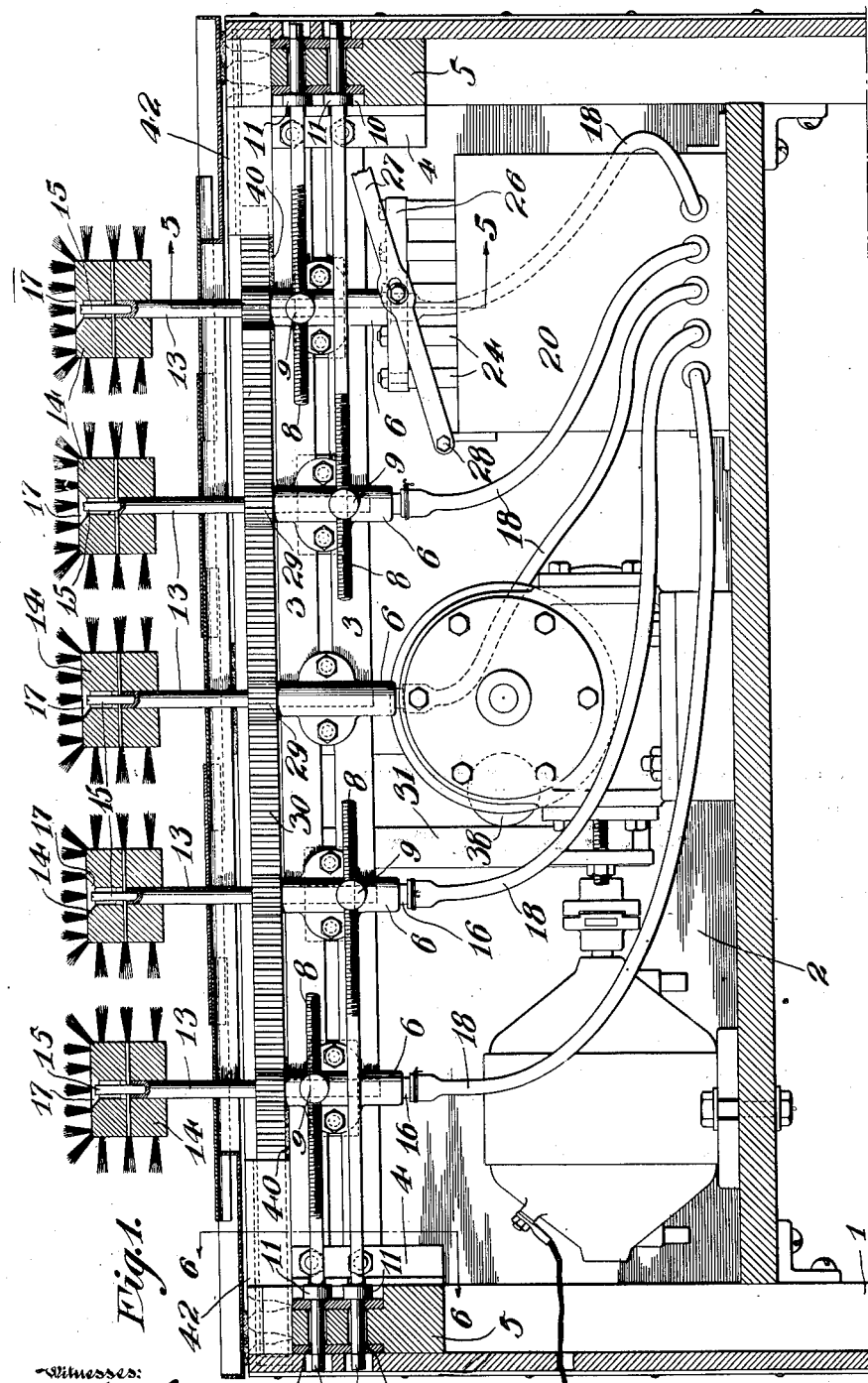

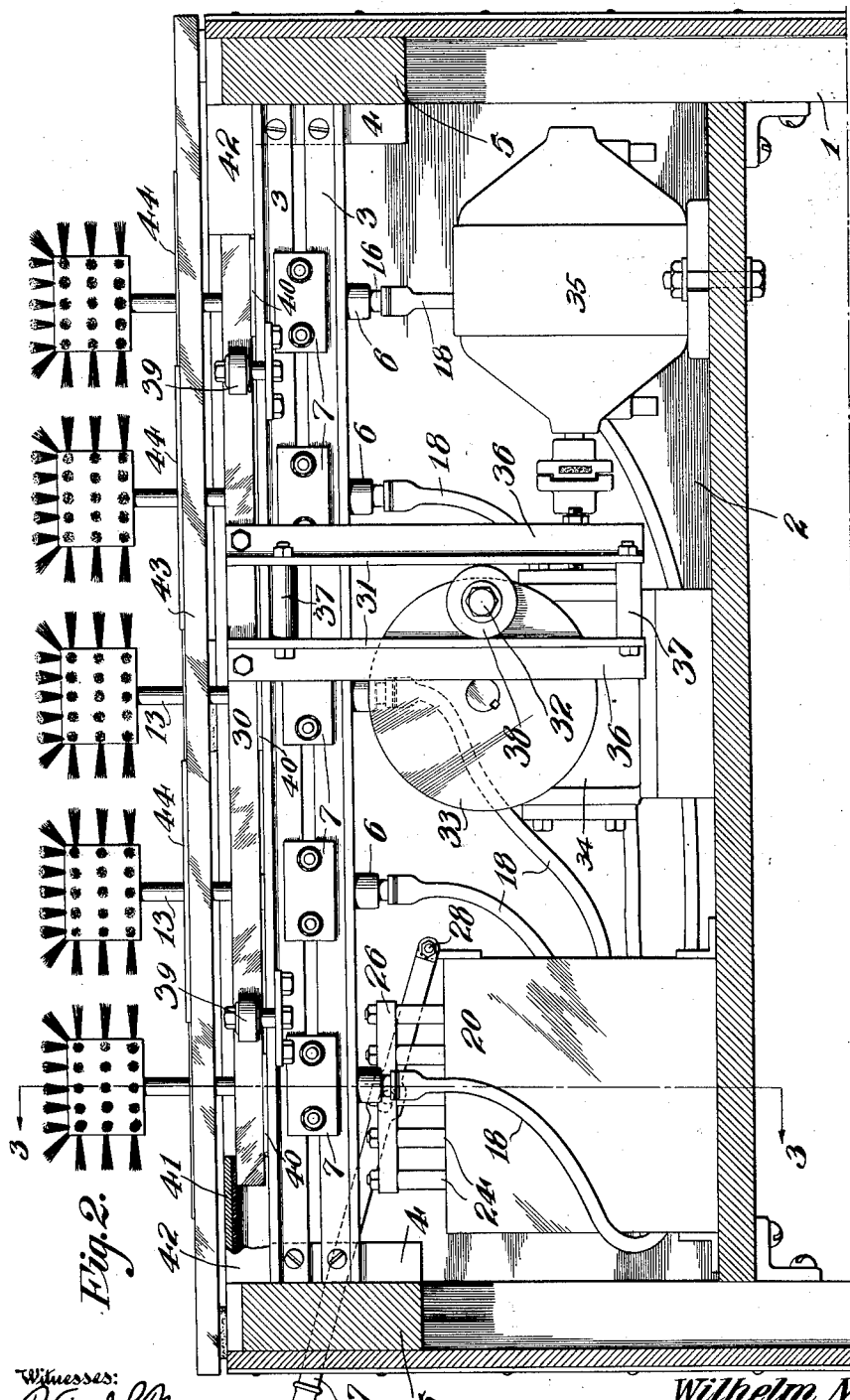

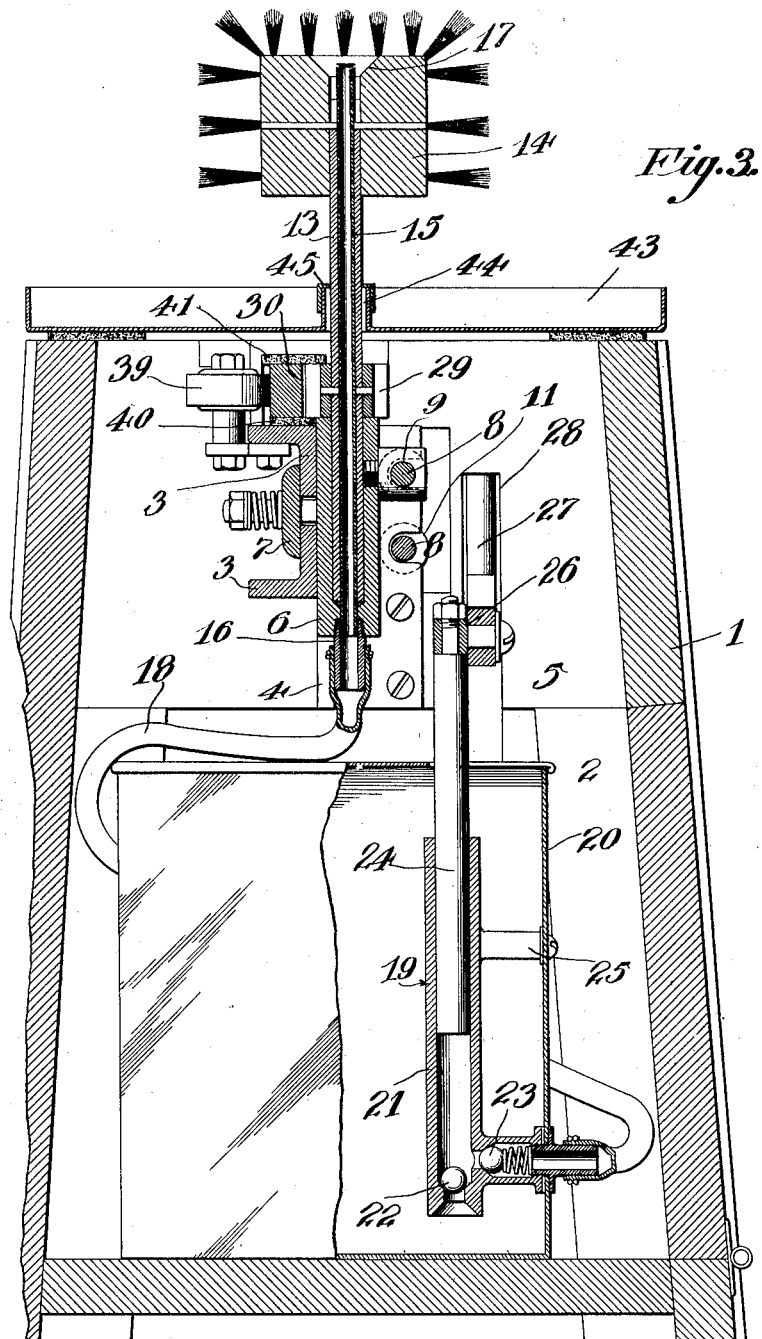

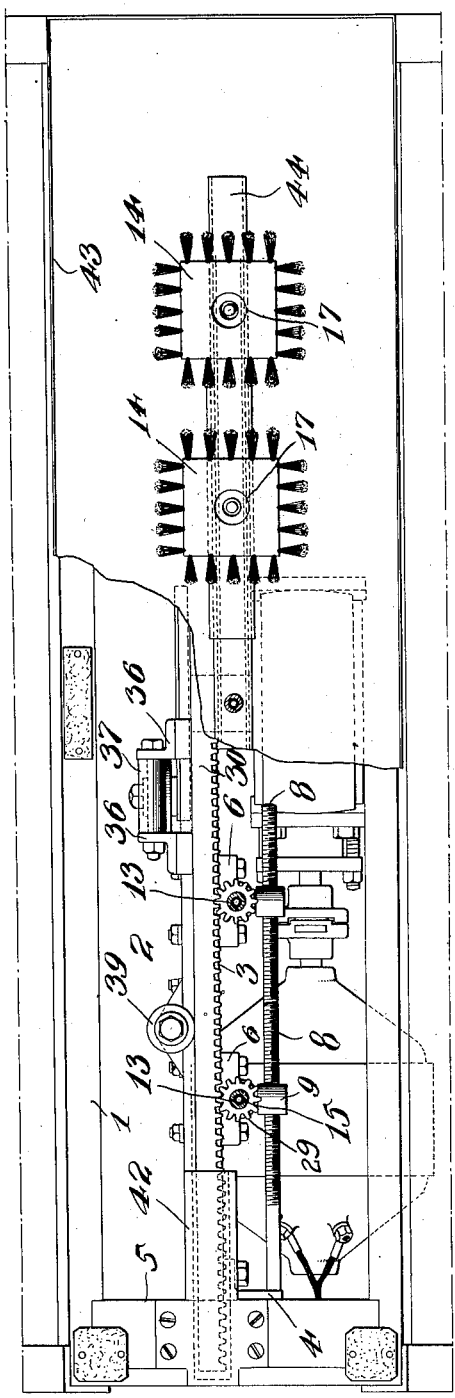
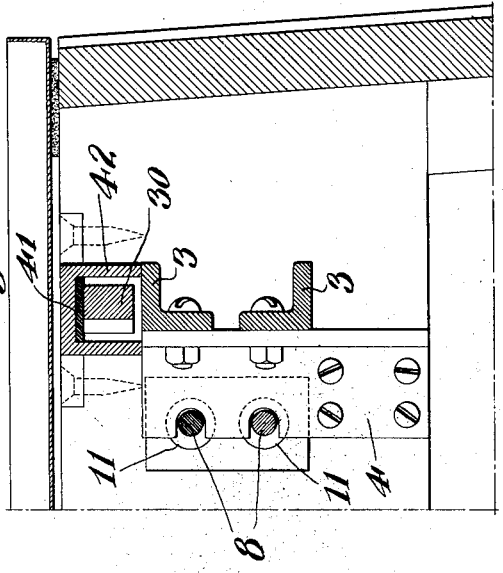
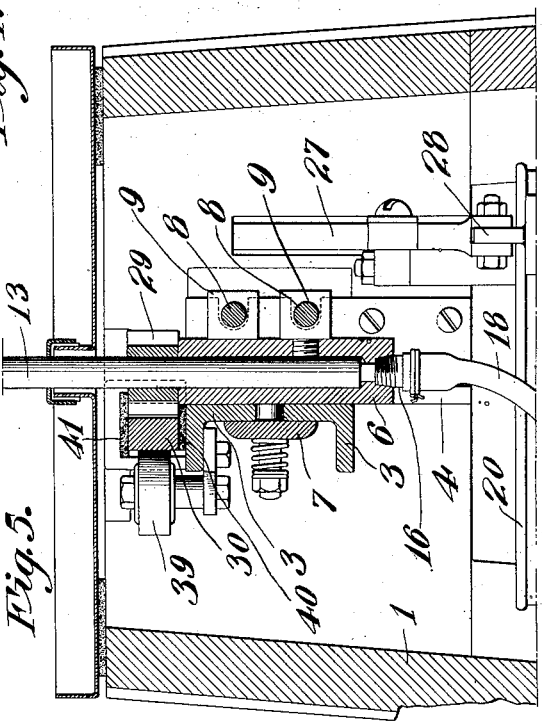

1,532,256

UNITED STATES PATENT OFFICE.

WILHELM MOLLER, OF LEWISTOWN, PENNSYLVANIA, ASSIGNOR TO EASY PAN GREASING MACHINE CO., OF PHILADELPHIA, PENNSYLVANIA.

PAN-GREASING MACHINE.

Application filed June 14, 1924. Serial No. 720,077.

*To all whom it may concern:*

Be it known that I, WILHELM MOLLER, a citizen of the United States, residing at Lewistown, in the county of Mifflin and State of Pennsylvania, have invented certain new and useful Improvements in Pan-Greasing Machines, of which the following is a specification.

My invention relates to machines for greasing pans for use in baking.

The usual method of greasing pans by machine is by rotating a series of vertically projecting brushes, manually greasing a portion of the first pan, inverting the pan and sliding it over the brushes. The first pan primes or feeds the grease to the brushes, the other pans are greased by sliding them over the brushes. The first pan is liberally, if not excessively, greased and each succeeding pan gets less grease until the grease on the brushes is practically exhausted when another pan must be greased manually. To lengthen the life of the bristles, the brushes are rotated alternately in reverse direction, and the abrupt stopping and starting of the reciprocating parts by which the alternating motion is effected soon wears and loosens the parts and the machine becomes noisy.

The objects of my invention are to provide a machine which may be manipulated to feed any desired amount of grease; in which the brushes are rotated alternately in reverse directions without abrupt stopping and starting of the reciprocating parts, and in which the positions of the brushes may be adjusted for use with pans of different size.

These objects, and other advantageous ends which will be described hereinafter, I attain in the following manner, reference being had to the accompanying drawings in which—

Figure 1 is a vertical section through a machine constructed in accordance with my invention looking in one direction, Figure 2 a like section looking in the other direction, Figure 3 an enlarged section on line 3—3 of Figure 2, Figure 4 a plan view, partly broken away, of the machine shown in Figure 1, Figure 5 a section on line 5—5 of Figure 1, and Figure 6 a section on line 6—6 of Figure 1.

Referring to the drawings, 1 indicates a frame of suitable construction having a compartment 2. A pair of spaced supporting guides 3, preferably of angle iron, are mounted on angle brackets 4 secured to the end walls 5 of compartment 2. A series of step bearings 6 are slidably mounted at one side of guides 3 by passing a pair of bolts through the bearings and between the guides, to the other side and securing a spring-pressed clamping plate 7 on the bolts. The spring-pressed clamping plate engages the other side of guides 3 and holds the bearing 6 to the guides. The bearings 6 may be adjusted toward or away from each other by a screw 8 having a threaded connection with the bearing at 9, rotatably mounted in end wall 5 at 10, and held against lengthwise movement by a collar 11 disposed between end wall 5 and angle bracket 4. An angular end 12 is formed on the end of each screw to fit a crank handle for turning the screw to adjust the bearings.

A spindle 13 has one end rotatably mounted in each bearing, and a brush 14 detachably connected to the other end. A stem 15, secured to the lower end of bearing 6 by a nipple 16, passes upward through spindle 13 and brush 14 to a point adjacent the top of the body of the brush which is counter-sunk as shown at 17. Stem 15 has its upper end closed and its cylindrical wall perforated near the top so that grease passing upward through the stem will be deflected radially against the conical surface 17 and onto the bristles of the brush. The grease is fed to the stem through a flexible tube 18 connected with nipple 16 and a pump 19 mounted in a tank 20. Pump 19 preferably consists of a cylinder 21 having an inlet check valve 22 and an outlet check valve 23 near its lower end and a plunger 24 sliding in the cylinder for sucking the grease from the tank into the cylinder and forcing it out of valve 23 through tube 18 and stem 15 to the bristles of the brush. A pump is provided for each stem 15. These pumps are preferably arranged in a manifold and secured to the tank as shown at 25 and the plungers are connected to a common bar 26 which has a pin and slot connection with an operating lever 27 pivoted at 28 to tank 20. The free end of the operating lever extends through a slot in the end wall 5.

Each brush-carrying spindle receives its alternate rotation in forward and reverse direction, through a gear 29 fixed to the spindle and a meshing rack 30 slidably mounted on the upper supporting guide 3. A slotted cross head 31 carried by rack 30 is operatively connected with a crank pin 32 carried by a crank 33 on a shaft leading to a reduction gear 34 which is connected with a motor 35. A rotary movement of crank 33 is transformed to a harmonic reciprocating motion by crank pin 32 and cross head 31 and transmitted to rack 30. The cross head is preferably constructed of a pair of spaced bars 36 secured to the rack and having spacers 37 secured therebetween. Crank pin 32 preferably carries an anti-friction roller 38 which travels between the bars 36. Rack 30 is guided in its sliding movement by its meshing gears 29 at one side, guide rollers 39 mounted on supporting guide 3 on the other side, wearing plates 40 on its lower side, and wearing plates 41 on its upper side. Wearing plates 40 are secured to the upper supporting guide 3 and wearing plates 41 are secured to housings 42 fixed to end walls 5. These housings prevent objects from getting between the ends of rack 30 and the end walls 5. Wearing plates 40 and 41 are preferably made of hard fiber which will retain a lubricant and prevent objectionable noises.

A drip pan 43 covers the top of the frame and serves to catch any grease which may drop from the brushes. Pan 43 has a longitudinal slot 44 through which spindles 13 project. Slot 44 is covered between the the spindles by U-shaped telescoping sections 45 having a spindle 13 passing through each section. The sections overlap each other so that an adjustment of the brushes will slide the sections relatively to each other. Any grease dripping from the brushes directly over the slot will be deflected from the slot by these telescoping sections.

To use the machine, the motor is started and rotates the brushes alternately in reverse directions. Lever 27 is manipulated to force grease from tank 20 through tube 18 and stem 15 to brushes 14. A pan is inverted and slid over the revolving brushes until it is properly greased. To grease different sized pans, the brushes are adjusted toward or away from each other by turning the screws 8. During the adjusting movement of the brushes, telescoping sections 45 will slide on each other without interfering with the adjustment.

It will be seen that, with the machine above described, the brushes will be rotated alternately in forward and reverse direction without abruptly stopping and starting the reciprocating parts connected therewith; the machine will run smoothly and quietly; none of the grease falling from the brushes will drop on moving parts, the brushes may be adjusted to grease different sized pans, and any desired amount of grease may be fed to the brushes without being touched by hand.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A pan greasing machine including a frame; a rack slidable on the frame; brushes; rotatable members carrying the brushes and operatively connected with the rack, and means for imparting harmonic reciprocating motion to the rack.

2. A pan greasing machine including a frame; a rack slidable on the frame; brushes; rotatable members carrying the brushes and operatively connected with the rack; a slotted cross-head on the rack; a crank having its pin slidable in the slot of the cross-head, and means for rotating the crank.

3. A pan greasing machine including a frame; a rack slidable on the frame; brushes; rotatable members carrying the brushes and operatively connected with the rack; a pair of spaced bars secured to the rack; spacers between the bars; a crank having its pin slidable between the bars and the spacers, and means for rotating the crank.

4. A pan greasing machine including a frame; a rack slidable on the frame; brushes; rotatable members carrying the brushes and operatively connected with the rack; a pair of spaced bars secured to the rack; spacers between the bars; a crank having a pin; a roller on the pin adapted to travel between the bars and spacers, and means for rotating the crank.

5. A pan greasing machine including a frame; spindles rotatable on the frame; brushes on the spindles; a rack slidable on the frame; means connecting the rack with the spindles, and means for imparting harmonic reciprocating motion to the rack.

6. A pan greasing machine including a frame; a pan covering the top of the frame and having a slot therein; rotatable spindles adjustably mounted in the frame and projecting through the slots above the pan; brushes on the spindles adapted to grease the pans, and telescoping members attached to the spindles and covering the slot.

In testimony whereof I have signed my name to this specification in the presence of two subscribing witnesses.

WILHELM MOLLER.

Witnesses:
CALGER MALLEE,
ELIZABETH GARBE.